United States Patent
Jeannesson et al.

(10) Patent No.: US 11,746,709 B2
(45) Date of Patent: Sep. 5, 2023

(54) METHOD AND SYSTEM FOR CONTROLLING A FUEL-METERING DEVICE

(71) Applicant: SAFRAN AIRCRAFT ENGINES, Paris (FR)

(72) Inventors: Florent Jeannesson, Moissy-Cramayel (FR); Boris Seewald, Munich (DE); Hang-Mi Tran, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 162 days.

(21) Appl. No.: 17/431,632

(22) PCT Filed: Jan. 31, 2020

(86) PCT No.: PCT/HR2020/050167
§ 371 (c)(1),
(2) Date: Aug. 17, 2021

(87) PCT Pub. No.: WO2020/169897
PCT Pub. Date: Aug. 27, 2020

(65) Prior Publication Data
US 2022/0120225 A1    Apr. 21, 2022

(30) Foreign Application Priority Data
Feb. 20, 2019  (FR) ...................... 1901682

(51) Int. Cl.
*F02C 9/26* (2006.01)
*F02C 9/32* (2006.01)
*F02C 9/46* (2006.01)

(52) U.S. Cl.
CPC .............. *F02C 9/263* (2013.01); *F02C 9/32* (2013.01); *F02C 9/46* (2013.01); *F05D 2260/80* (2013.01);
(Continued)

(58) Field of Classification Search
CPC .... F02C 7/22; F02C 7/232; F02C 9/32; F02C 9/46; F02C 9/263; F16K 37/0075;
(Continued)

(56) References Cited

U.S. PATENT DOCUMENTS

| | | | | |
|---|---|---|---|---|
| 5,279,107 A | * | 1/1994 | Meisner | F02C 9/28 60/773 |
| 8,831,855 B2 | * | 9/2014 | Masse | F02C 9/00 60/773 |

(Continued)

FOREIGN PATENT DOCUMENTS

| | | |
|---|---|---|
| FR | 3 018 098 A1 | 9/2015 |
| WO | WO 2017/194881 A1 | 11/2017 |

OTHER PUBLICATIONS

International Search Report and Written Opinion issued in International Application No. PCT/FR2020/050167, dated May 12, 2020 (8 pages).

(Continued)

*Primary Examiner* — Alain Chau
(74) *Attorney, Agent, or Firm* — Bookoff McAndrews, PLLC (57) ABSTRACT

A method for controlling a fuel metering device with a movable metering element, comprising at least two iterations of the following steps:
- a detection (E1) of a possible change in the operating state among two position sensors of the metering element, if no change in the operating state is detected, a determination (E2_1) of the position of the metering element from an average of the measurements of the sensors or otherwise a determination (E2_2) from the non-defective sensor,
- a determination (E4) of a fuel flow rate setpoint, a conversion (E5) of the flow rate setpoint, (Continued)

a determination (E6) of a command of displacement of the metering element, a control (E7) of the position of the metering element, and if a change in the operating state is detected, the calculation of an instantaneous fuel flow rate from the position of the metering element, and, during the second iteration of the method, the determination of the flow rate setpoint according to instantaneous flow rate to match the position setpoint to the position of the metering element.

8 Claims, 4 Drawing Sheets

(52) U.S. Cl.
CPC ...... *F05D 2260/84* (2013.01); *F05D 2270/46* (2013.01)

(58) Field of Classification Search
CPC ............. F16K 37/0083; F16K 37/0025; F16K 37/0041; G05B 19/4062; G05B 2219/34013; G05B 23/0218; G05B 23/0205; G05B 23/0221; F05D 2260/80; F05D 2260/84; F05D 2260/46
See application file for complete search history.

(56) References Cited

U.S. PATENT DOCUMENTS

| | | | |
|---|---|---|---|
| 9,261,024 B2* | 2/2016 | Gaully | F02C 7/22 |
| 11,320,801 B2* | 5/2022 | Foiret | F02C 9/32 |
| 11,519,340 B2* | 12/2022 | Deneuve | F02C 9/46 |
| 2013/0091851 A1* | 4/2013 | Gaully | F02C 9/263 60/734 |
| 2019/0171182 A1* | 6/2019 | Foiret | G05B 19/4062 |
| 2019/0226353 A1* | 7/2019 | Karpman | F01D 21/003 |
| 2019/0226354 A1* | 7/2019 | Karpman | F01D 21/14 |
| 2021/0054765 A1* | 2/2021 | Lopez | F02C 7/232 |
| 2022/0090543 A1* | 3/2022 | Deneuve | F02C 9/32 |
| 2022/0154602 A9* | 5/2022 | Lopez | H02J 3/381 |

OTHER PUBLICATIONS

Search Report issued in French Application No. 1901682, dated Nov. 4, 2019 (2 pages).

* cited by examiner

[Figs. 1]

PRIOR ART

[Figs. 2]

PRIOR ART

METHOD AND SYSTEM FOR CONTROLLING A FUEL-METERING DEVICE

CROSS-REFERENCE TO RELATED APPLICATIONS

This application is the U.S. national phase entry under 35 U.S.C. § 371 of International Application No. PCT/FR2020/050167, filed on Jan. 31, 2020, which claims priority to French Patent Application No. 1901682, filed on Feb. 20, 2019.

TECHNICAL FIELD

The invention relates to the general field of the turbomachines. More specifically, the invention relates to a method and a system for controlling a fuel metering device with a slide, for a combustion chamber of a turbomachine. It applies in a privileged but non-limiting manner to the turbomachines used in the field of aeronautics.

PRIOR ART

Figure 1:
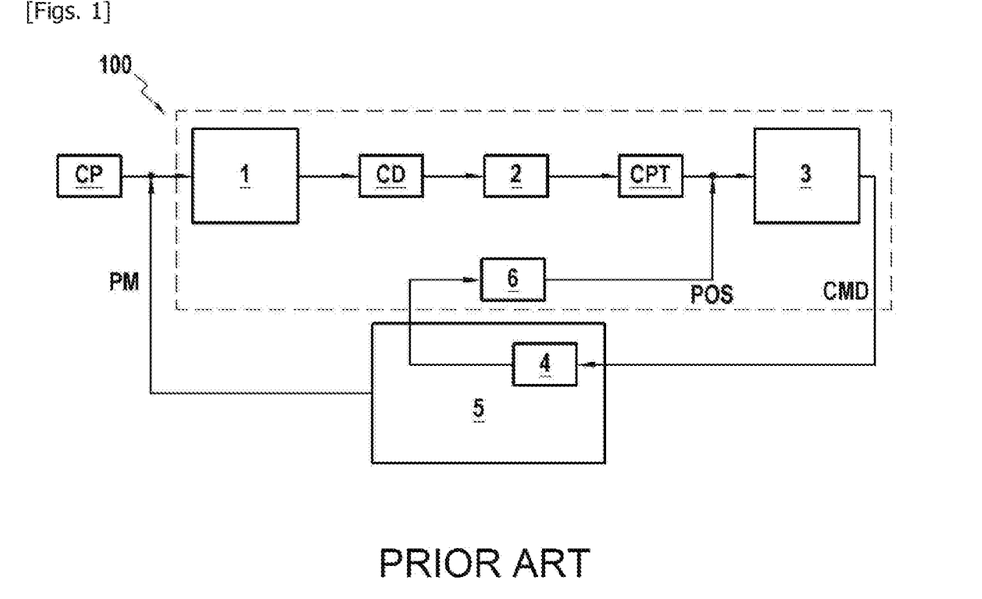
FIG. 1 is a simplified representation of a system for controlling a metering device made according to the state of the art.

FIG. 1 illustrates a system for controlling 100 a fuel metering device according to the state of the art. In a known manner, the flow rate of fuel injected into the combustion chamber of a turbomachine 5 is determined by a metering device 4, also called metering valve (FMV for Fuel Metering Valve). The metering device 4 is provided with a movable metering element, for example in the form of a member called slide which is movable in translation in a frame called liner, the liner being provided with a metering slot that can be more or less sealed by the slide. The metered fuel flow rate is proportional to the unsealed section of the slot. Such a metering device is described by way of example in the application FR2846711A1. The flow rate of fuel injected by the metering device 4 therefore depends on the position of the movable metering element, for example of the slide, and allows regulating the power delivered by the turbomachine 5. Depending on the type of the metering valve, the movable metering element can take other forms than a slide, for example a bushel or a plate which are movable in rotation. In the following, the metering device 4 is described as a slide metering valve, but it is understood that the invention applies to any metering valve with a movable metering element.

In a known manner, the position of the slide of the metering device 4 is controlled as follows. A loop for monitoring 1 the power of the turbomachine 5 receives a requested power setpoint CP, for example received following a request from the pilot, as well as a measurement representative of the power PM of the turbomachine 5. This measurement can be the power PM of the turbomachine 5 or any other representative parameter related thereto, for example the speed of rotation of a shaft (e.g.: the low-pressure shaft) of the turbomachine. The monitoring loop 1 then determines a flow rate setpoint CD of fuel to be delivered to the combustion chamber of the turbomachine 5. A converter 2 then converts the flow rate setpoint CD into a position setpoint CPT of the slide of the metering device 4. A loop for monitoring 3 the position of the slide then takes as inputs the position setpoint CPT of the slide and a position POS of the determined slide in order to calculate a command CMD signal to move the slide. The command CMD signal, typically a command current of an actuator associated with the slide, is intended to match the position POS of the slide with the position setpoint CPT, thus allowing injecting into the combustion chamber of the turbomachine 5 a fuel flow rate adapted to the requested power setpoint CP.

In practice, in a nominal situation, two separate position sensors measure the position of the slide of the metering device 4. The position POS of the slide is then determined from an average of the respective measurements returned by these two position sensors. A malfunction of one of the two sensors, although unlikely, remains possible. The present invention relates to this case, in which one of the two sensors remains functional, that is to say does not return erroneous measurements, and does not deal with the very unlikely case of a simultaneous malfunction of the two sensors. In case of malfunction of one of the position sensors, the position POS of the slide is then determined based on the measurements of the other sensor which is for its part functional, and possibly using a measurement of the flow rate DEB of fuel injected into the combustion chamber of the turbomachine 5.

Figure 2:
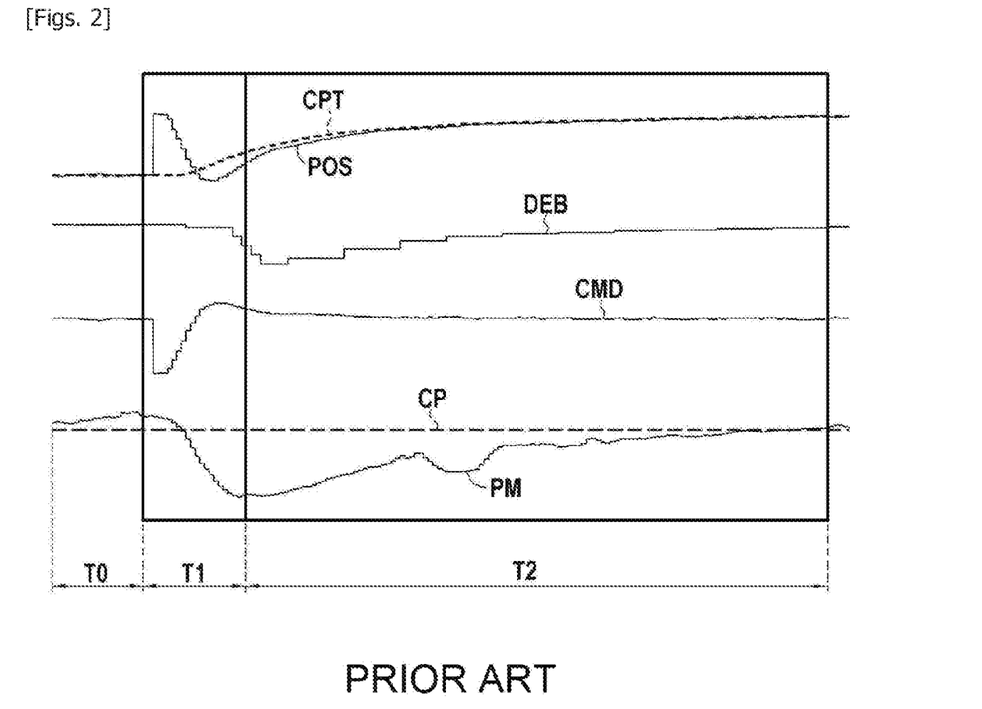
FIG. 2 illustrates the time variations of various variables relating to the control system of FIG. 1.

The current technique for controlling the position POS of the slide of the metering device 4 nevertheless has several drawbacks which will be explained in relation to FIG. 2. This figure has for the same time abscissa the respective variations on the ordinate of the position setpoint CPT, of the position POS of the slide, of the measured fuel flow rate DEB, of the measured power PM of the turbomachine 5 and of its power setpoint CP.

In this figure, it is initially observed, during a time period T0, that the position POS of the slide coincides with the position setpoint CPT value of the slide. Consequently, the measured power PM of the turbomachine 5 responds to the requested power setpoint CP. In this example, during this initial situation, one of the sensors among the two position sensors measuring the position of the slide already has a malfunction which however has not yet been detected. Nevertheless, despite the failure of this sensor, the position setpoint CPT value of the slide and the power setpoint CP value are still met thanks to the monitoring loops 1, 3. During this initial period T0, the position POS of the slide is therefore initially determined by calculating the average of the measurements returned by the two position sensors.

During a time period T1 consecutive to the time period T0, a detection logic 6 associated with the position sensors detects an anomaly in the measurements returned by one of the position sensors (e.g. a saturated signal) and then deduces a malfunction of this sensor. Following this detection, the measurements of the sensor having a malfunction, that is to say detected as defective, are no longer used. The position POS of the slide is then subsequently determined based on the measurements of the other sensor which is for its part functional. This change in the method for determining the position POS of the slide is observed in FIG. 2 as a sudden increase in the position POS signal. The position POS signal indeed switches from a value initially averaged based on the measurements of two position sensors, to a higher value determined from the single functional sensor. This increase therefore reflects here the fact that the slide actually has a larger opening position than initially estimated during the time period T0, period for which the failure of one of the sensors was already effective but was not yet detected.

Consequently, following the detection of the malfunction of a position sensor by the detection logic 6, the position POS of the slide no longer corresponds to the position setpoint CPT signal of the slide. In order to reduce this deviation, the loop for monitoring 3 the position of the slide then seeks to re-close the slide, that is to say to reduce the value of the position POS signal, to bring it closer to the position setpoint CPT signal. The control of the slide by the monitoring loop 3 then consists of adapting the command signal CMD, here a command current of an actuator associated with the slide. A variation of the command CMD signal produced by the monitoring loop 3 is therefore observed during the time period T1, in order to make the position POS of the slide converge towards its position setpoint CPT.

During this same time period T1, the reduction in the opening of the slide by the monitoring loop 3 in order to converge towards the position setpoint CPT has the direct effect of reducing the flow rate DEB of fuel injected into the combustion chamber of the turbomachine. 5. The reduction in the fuel flow rate DEB then causes a temporary reduction in the power provided thereby. It is thus observed during the time period T1 that the measured power PM of the turbomachine 5 falls below the requested power setpoint CP and reaches a minimum value.

The measured power PM being an input variable of the loop for monitoring 1 the power of the turbomachine 5, this monitoring loop 1 then recalculates a new flow rate setpoint CD of fuel to be injected, in order to comply with the required power setpoint CP. This flow rate setpoint is then converted by converter 2 into a new position setpoint CPT of the slide. Thus, the monitoring loop 1 indirectly corrects the position setpoint CPT of the slide in order to readjust the flow rate DEB of fuel injected into the combustion chamber and allow the power of the turbomachine 5 to again reach the requested power setpoint CP. A gradual increase in the position setpoint CPT, linked to the power monitoring loop 1 is thus observed during the time periods T1 and T2. This indeed recalculates a higher flow rate setpoint CD of the fuel to be injected which, once converted by the converter 2, results in a larger opening setpoint of the slide of the metering device 4. The time period T2 then corresponds to a transition period during which the power monitoring loop 1 compensates for the momentary power PM drop in the turbomachine 5, until it again corresponds to the expected power setpoint CP.

The mechanism described here therefore allows controlling the position of the slide of the metering device 4, so that the turbomachine 5 provides a power PM in accordance with the requested power setpoint CP. However, as explained above, the detection of the failure of a position sensor for the slide of the metering device 4 can lead to observe a sudden deviation between the position POS of the determined slide and its position setpoint CP. This deviation then triggers a regulation mechanism from the loop for monitoring 3 the position of the slide, which reduces the opening of the slide and can then temporarily lead to a decrease in the power of the turbomachine 5. This power decrease is then rectified by the power monitoring loop 1 which recalculates a new fuel flow rate setpoint. Such a power decrease, even temporary, is however not desirable if it is desired to benefit from the optimum performances of the turbomachine 5. It would therefore be desirable to limit any risk of a power drop in the turbomachine 5 following the detection of a failure of a position sensor.

DISCLOSURE OF THE INVENTION

The present invention aims to overcome the aforementioned drawbacks. To this end, the invention proposes a method for controlling a fuel metering device with a movable metering element for a combustion chamber of an aircraft turbomachine, this method comprising at least two iterations of the following steps:

a) a step of detecting a possible change in the operating state of a position sensor among a first position sensor and a second position sensor measuring the position of the metering element, the other sensor remaining functional, each position sensor being either operating or malfunctioning;

b) if the two sensors are operating, a first step of determining the position of the metering element from an average between a first position measurement of the first position sensor and a second position measurement of the second position sensor;

c) if one of the two position sensors is malfunctioning, the other position sensor remaining in operation, a second step of determining the position of the metering element from a position measurement of the position sensor remaining in operation;

d) a step of determining a flow rate setpoint of fuel to be provided to the combustion chamber from a power setpoint of the turbomachine and a power measurement of the turbomachine;

e) a step of converting the determined flow rate setpoint into a position setpoint of the metering element;

f) a step of determining a command of displacement of the metering element from the position setpoint of the metering element and the position determined for the metering element;

g) a step of controlling the position of the metering element according to the determined displacement command.

If a change in the operating state of one of the first and second position sensors or of the second position sensor is detected during step a), the method further comprises before step d) of determining a flow rate setpoint of the current iteration:

h) a step of calculating a first instantaneous flow rate of fuel delivered by the metering device to the combustion chamber from the position of the metering element determined in step b) or c) of the current iteration according to the operating state of the position sensors;

i) a step of calculating a second instantaneous flow rate of fuel delivered by the metering device to the combustion chamber from the position of the metering element determined in step b) or c) of the previous iteration according to the operating state of the position sensors during the previous iteration;

j) a step of determining a fuel flow rate deviation between the first instantaneous fuel flow rate calculated in step h) and the second instantaneous fuel flow rate calculated in step i), and following step d) of determining a flow rate setpoint of the current iteration:

k) a step of correcting the flow rate setpoint determined in step d) taking into account the flow rate deviation determined in step j), so as to match the position setpoint of the metering element with the position of the metering element determined in step b) or c) of the current iteration according to the operating state of the position sensors.

In nominal operation, that is to say in the absence of malfunction of a position sensor, the position of the metering element is determined from an average between a first position measurement of the first position sensor and a second position measurement of the second position sensor. The detection of the malfunction of a sensor induces a change in the method for determining the position of the metering element which is then determined from the position measurement of the functional position sensor. This change in the determination of the position of the metering element may possibly induce a sudden variation thereof. Advantageously, the method proposed here then allows preventing a deviation between the position of the determined metering element and its position setpoint. Indeed, following the detection of a malfunction of a sensor and the determination of the position of the metering element from the functional position sensor, a theoretical value of the instantaneous fuel flow rate corresponding to the position of the metering element is calculated. This calculated instantaneous fuel flow rate value is then used to determine the fuel flow rate deviation between the calculated instantaneous fuel flow rate and the calculated instantaneous flow rate for the previous iteration, that is to say with the position of the metering element in the previous iteration, i.e. before the detection of the change in the operating state of one of the position sensors. The flow rate setpoint is then corrected according to this deviation so as to match the position setpoint of the metering element with the position of the metering element. Thus, following the detection of the malfunction of a sensor, even if the determined position of the metering element has a sudden deviation from its initially determined position, the position setpoint of the metering element then matches with the position of the metering element. Consequently, no deviation between the position setpoint of the metering element and the determined position of the metering element is detected. It follows that no logic of regulation of the position of the metering element seeks to readjust the position of the metering element to compensate for a deviation with the position setpoint, this deviation here being zero. Following a change in the method for determining the position of the metering element, the position of the metering element therefore remains unchanged. Consequently, the flow rate of fuel delivered by the metering device to the combustion chamber remains constant. As the delivered flow rate remains constant and the position of the metering element corresponds to the position setpoint, the power delivered by the turbomachine also remains constant and continues to correspond to the requested power setpoint. Thus, following the detection of the malfunction of a position sensor, a change in the determination of the position of the metering element does not impact the power delivered by the turbomachine.

In one exemplary embodiment of this method, the detection of a possible change in the operating state of a position sensor in step c) is carried out when the deviation between the first position measurement of the first position sensor and the second position measurement of the second position sensor is greater than a predetermined threshold.

In one exemplary embodiment of this method, when a change in the operating state of a position sensor is detected, the determination of the position of the metering element in step e) is carried out from the following steps:
  a step of calculating an average position of the metering element from an average between the first position measurement of the first position sensor and the second position measurement of the second position sensor;
  a step of calculating an estimated flow rate of fuel as delivered by the metering device to the combustion chamber for the calculated average position; and
  if the calculated fuel flow rate is below a predetermined threshold, determining the position of the metering element as corresponding to the largest measurement among the first measurement and the second measurement;
  if the calculated fuel flow rate is greater than a predetermined threshold, receiving a measurement relating to the flow rate of fuel delivered by the metering device to the combustion chamber, determining a theoretical position of the metering element corresponding to the measured fuel flow rate, and determining the position of the metering element from the measurement closest to the theoretical position among the first measurement and the second measurement.

The invention also proposes, according to another aspect, a computer program including code instructions for implementing the method summarized above when it is executed by a computer or a real-time calculation device.

The invention also proposes, according to another aspect, a system for controlling a fuel metering device with a movable metering element for a combustion chamber of a turbomachine, this system comprising:
  a first position sensor and a second position sensor configured to measure the position of the metering element of the metering device;
  measuring means configured to measure the power of the turbomachine;
  a detection module configured to detect a possible change in the operating state of one of the position sensors among the first position sensor and the second position sensor, each position sensor being either operating or malfunctioning;
  a selection module configured to determine
    if the two position sensors are operating, the position of the metering element from an average between a first position measurement of the first position sensor and a second position measurement of the second position sensor;
    if one of the two position sensors is malfunctioning, the other position sensor remaining in operation, the position of the metering element from a position measurement of the position sensor remaining in operation;
  a first monitoring module configured to determine a flow rate setpoint of fuel to be provided to the combustion chamber from a power setpoint of the turbomachine and from the power measurement of the turbomachine;
  a converter configured to convert the determined flow rate setpoint into a position setpoint of the metering element;
  a second monitoring module configured to determine a command of displacement of the metering element from the position setpoint of the metering element and the position determined for the metering element;
  an actuator configured to control the position of the metering element according to the determined displacement command;
  the system further comprising a calculation module configured to calculate, if a change in the operating state of the first or second position sensor is detected by the detection module, an instantaneous flow rate of fuel delivered by the metering device to the combustion chamber from the last position determined of the metering element, calculate a second instantaneous flow rate of fuel delivered by the metering device to the combustion chamber from the position of the metering element preceding the last determined position, and calculate the fuel flow rate deviation between the first calculated instantaneous fuel flow rate and the second calculated instantaneous fuel flow rate; and
  the first monitoring module being configured, if a change in the operating state of the first position sensor or of the second position sensor is detected by the detection module, to determine the flow rate setpoint by further taking into account the fuel flow rate deviation calculated by the calculation module, so as to match the position setpoint of the metering element with the position of the metering element determined by the selection module.

In one exemplary embodiment of this system, the detection module is configured to detect a possible change in the operating state of a position sensor when the deviation between the first position measurement of the first position sensor and the second position measurement of the second position sensor is greater than a predetermined threshold.

In one exemplary embodiment of this system, when the detection module detects a change in the operating state of a position sensor, the selection module is configured to:
calculate an average position of the metering element from an average between the first position measurement of the first position sensor and the second position measurement of the second position sensor;
calculate an estimated flow rate of fuel as delivered by the metering device to the combustion chamber for the calculated average position; and
if the calculated fuel flow rate is below a predetermined threshold, determine the position of the metering element as corresponding to the largest measurement among the first measurement and the second measurement;
if the calculated fuel flow rate is greater than a predetermined threshold, receive a measurement relating to the flow rate of fuel delivered by the metering device to the combustion chamber, determine a theoretical position of the metering element corresponding to the measured fuel flow rate, and determine the position of the metering element from the measurement closest to the theoretical position among the first measurement and the second measurement.

In one exemplary embodiment of this system, the first monitoring module, the converter, the detection module, the selection module, the second monitoring module and the calculation module form control means integrated into a specific unit or in an existing electronic unit.

BRIEF DESCRIPTION OF THE DRAWINGS

Other characteristics and advantages of the invention will emerge from the following description of particular embodiments of the invention, given by way of non-limiting examples, with reference to the appended drawings, in which.

DESCRIPTION OF THE EMBODIMENTS

The invention will be described below within the framework of its application to a turbomachine which can be for example a propulsion engine turbomachine for an aircraft, a helicopter turbine, an industrial turbine or an Auxiliary Power Unit (APU) turbine.

Figure 3:
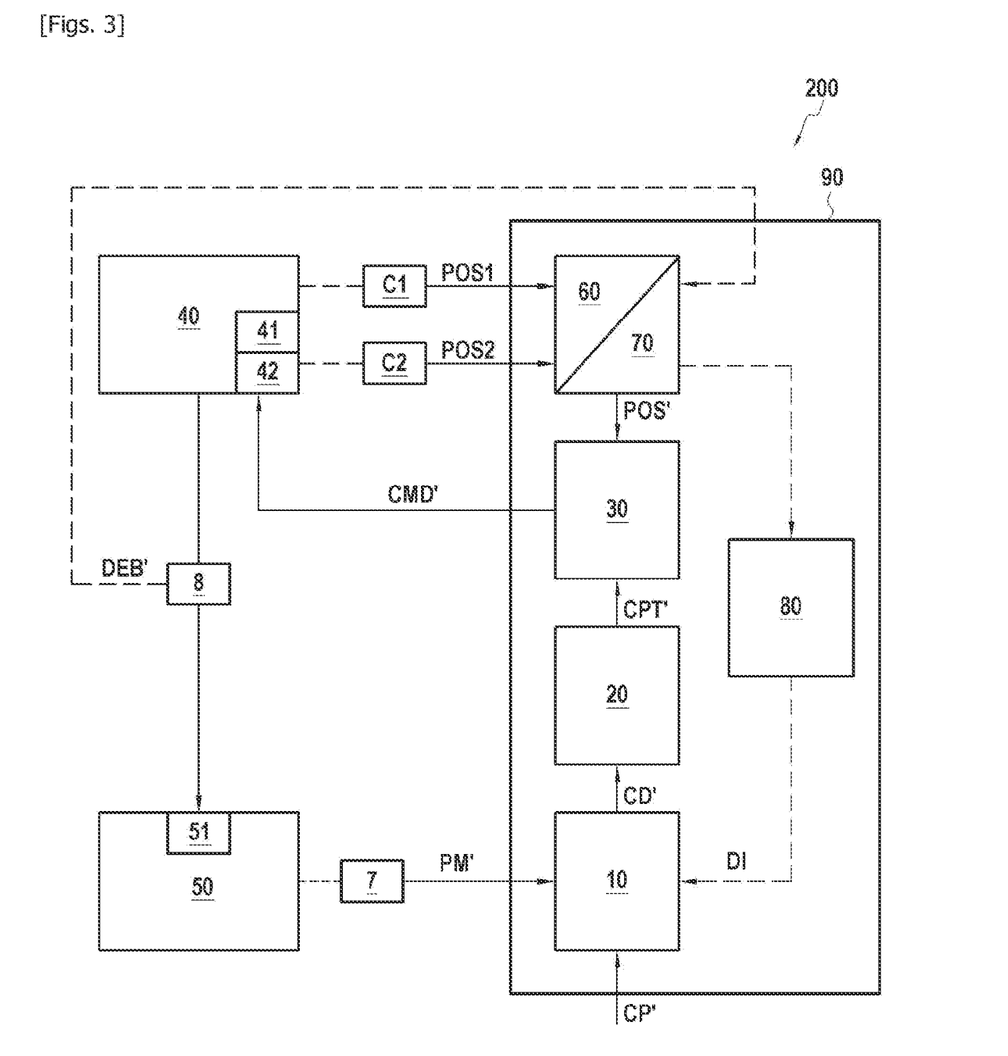
FIG. 3 is a simplified representation of a system for controlling a metering device according to one embodiment.

FIG. 3 represents a system for controlling 200 a metering device 40 intended to supply fuel to a combustion chamber 51 of a turbomachine 50.

The metering device 40 allows adjusting the amount of fuel provided by a supply circuit to the combustion chamber 51. To this end, the metering device 40 is provided with a movable metering element, for example a slide 41 or metering valve (FMV for Fuel Metering Valve). The fuel passage section, denoted S, also called opening surface of the metering device 40, depends on the position of the slide 41. A member (not represented) keeps the pressure difference constant on either side of the slide 41 and the fuel volume flow rate is therefore proportional to section S. It will be noted that the relationship between the section S and the position of the slide is known per se and will not be detailed further.

Thus, the command of displacement of the slide 41 allows regulating the flow rate of fuel injected into the combustion chamber. To do so, an actuator 42 associated with the slide 41 is configured to receive a command CMD' signal and move the slide 41 so as to match the position POS' of the latter with the position allowing obtaining the flow rate associated with the received command CMD'.

The position POS' of the slide 41 is, in a nominal situation, determined from the average of two position measurements POS1, POS2 respectively made by two position sensors C1, C2 independently measuring the position of the slide 41. It is meant here by "nominal situation", a situation for which the two position sensors C1, C2 are functional, that is to say do not have any anomaly in the position measurement POS1, POS2 signals they return.

Conversely, in a malfunction situation, one of the position sensors C1, C2 can have, by way of non-limiting examples, a saturated position POS1, POS2 signal, a significant position POS1, POS2 signal deviation with respect to the position POS2, POS1 signal returned by the other sensor, an absence of signal, or even a position POS1, POS2 signal that cannot be used (for example noisy). The discrimination of a functional position sensor C1, C2 from a defective position sensor C2, C1 may be possibly based on a measurement of the flow rate DEB' of fuel delivered by the metering device 40 to the combustion chamber 51 of the turbomachine 50. The fuel flow rate DEB' is measured by a flowmeter 8, for example a torquemeter, a propeller flowmeter or a volume flowmeter. The detection of the malfunction of a position sensor C1, C2 as well as the determination of the position POS1, POS2 of the sensor will be detailed later.

The control system 200 further comprises measuring means 7 configured to measure the power PM' provided by the turbomachine 50. The power measurement PM' signal is received by a logic of monitoring of the turbomachine 50 power, detailed subsequently, which determines whether the flow rate of fuel injected into the combustion chamber 51 of the turbomachine 50 is sufficient, and accordingly adjusts a flow rate setpoint of fuel to be injected into the combustion chamber 51.

In order to control the position of the slide 41 of the metering device 40, and thus regulate the flow rate of fuel injected into the combustion chamber 51, the control system 200 further comprises control means 90 comprising a first monitoring module 10, a converter 20, a second monitoring module 30, a detection module 60, a selection module 70 and a calculation module 80.

The control means 90 are configured to execute a computer program comprising code instructions designed to implement an algorithm for controlling the position of the slide 41. These control means 90 can be integrated into a specific unit or into an existing electronic unit. For example, the control means 90 may be part of the calculator or more particularly, of the digital engine regulation device ECU (Engine Control Unit) or of the device for monitoring the engine health EMU (Engine Monitoring Unit).

Figure 4:
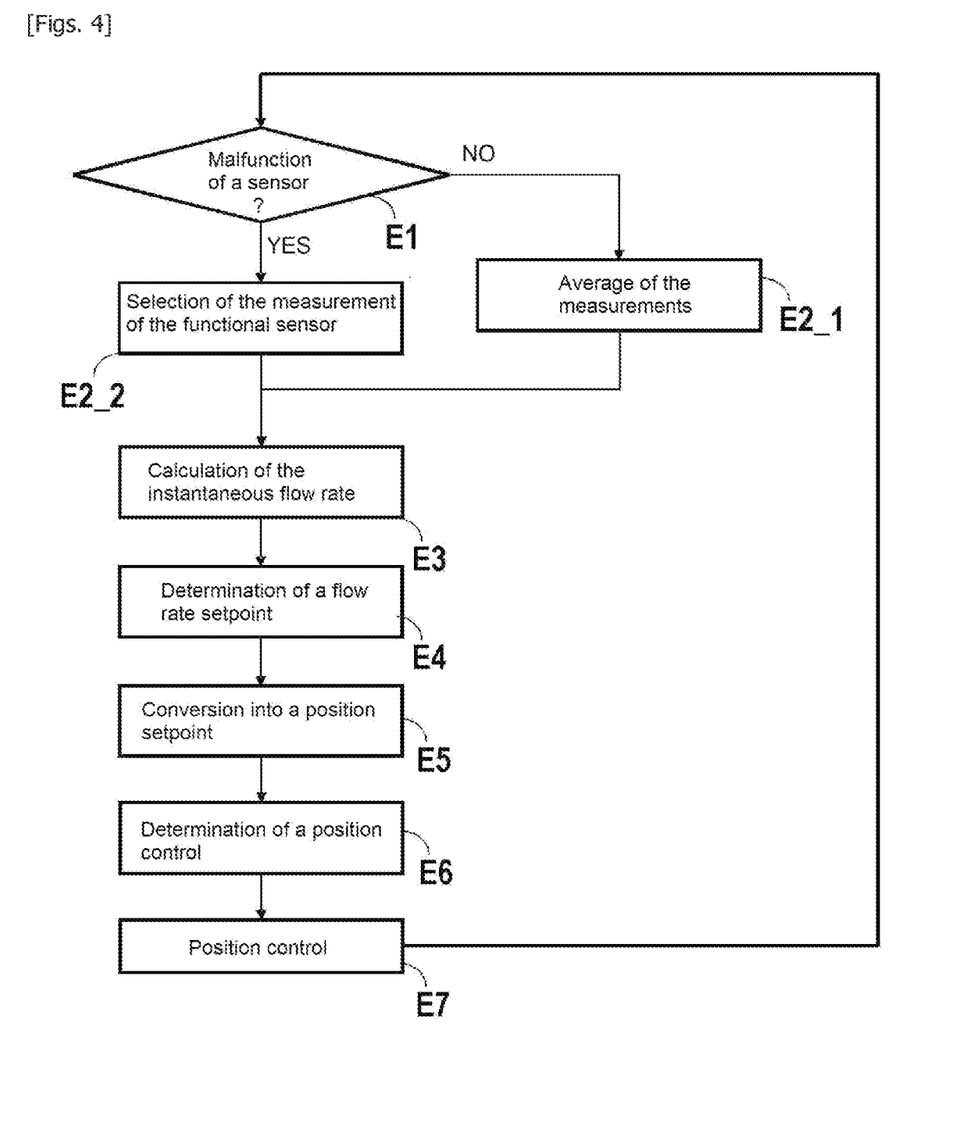
FIG. 4 illustrates the different steps of an iteration of a method for controlling the position of the slide of the metering device of FIG. 3 according to one embodiment.

The control of the position of the slide 41 of the metering device 40 is now described in relation to FIGS. 3 and 4, FIG. 4 illustrating the different steps of an iteration of a method allowing controlling the position of the slide of the metering device of FIG. 3 according to one embodiment.

During a first step E1, the detection module 60 takes as inputs the measurements of respective positions POS1, POS2 of the position sensors C1, C2 and uses them to detect a possible situation of a change in the operating state of one of these sensors C1, C2, that is to say a possible malfunction of one of these sensors while the two position sensors were operating during the previous iteration of the steps of this method or a possible operating situation of the two sensors while one of the two sensors was no longer operating during the previous iteration of the steps of this method.

The detection module 60 detects, for example, the malfunction of one of the position sensors C1, C2 if one of the sensors returns a saturated position measurement POS1, POS2 signal, or if the position sensors C1, C2 have a large deviation between their respective position measurement POS1, POS2 signals. Thus, if the deviation between a first measurement POS1 of the first position sensor C1 and a second measurement POS2 of the second position sensor C2 is greater than a predetermined threshold, the detection module 60 detects a malfunction among the position sensors C1, C2. The identification of the defective or functional position sensor C1, C2 among these two sensors is then determined by the selection module 70.

The selection module 70 is associated with the detection module 60 and determines, depending on the result of the previous step E1, the position POS' of the slide 41 of the metering device 40.

If the detection module 60 does not detect during the first step E1 any malfunction among the position sensors C1, C2, the selection module 70 determines during a step E2_1 the position POS' of the slide 41 by calculating the average of a first measurement POS1 and a second measurement POS2 of the position of the slide 41 respectively measured by the position sensors C1, C2.

Conversely, if the detection module 60 detects during the first step E3 a malfunction among the position sensors C1, C2, the selection module 70 seeks to discriminate the functional position sensor C1, C2 from the position sensor C2, C1 showing a malfunction. Once this discrimination has been made, the selection module determines the position POS' of the slide 41 as corresponding to the measurement POS1, POS2 of the position of the non-defective position sensor C1, C2.

If the deviation between a first measurement POS1 of the first position sensor C1 and a second measurement POS2 of the second position sensor C2 is greater than a predetermined threshold, the identification of a defective position sensor C1, C2 by the selection module 70 can be made as follows. If the detection module detects a malfunction of a position sensor C1, C2, the selection module 70 then calculates an average position of the slide 41 corresponding to the average between the first position measurement POS1 from the first position sensor C1 and the second position measurement POS2 from the second position sensor C2. Knowing the geometric dimensions of the metering device 40 and of its slide 41, the selection module 70 then calculates an estimated fuel flow rate as delivered by the metering device 40 to the combustion chamber 51, the calculated flow rate corresponding to the calculated average position of the slide 41.

If the calculated fuel flow rate is below a predetermined threshold, the selection module 70 determines the position POS' of the slide as corresponding to the largest measurement value among the first position measurement POS1 and the second position measurement POS2. In other words, the defective position sensor C1, C2 is here determined by the selection module 70 as the one returning the lowest position measurement POS1, POS2, and only the measurement of the other sensor is taken into consideration to deduce the current position POS' of the slide 41.

Conversely, if the calculated fuel flow rate is greater than said predetermined threshold, the selection module 70 is based on the measurement of the fuel flow rate DEB' of the flowmeter 8 to discriminate the functional position sensor C1, C2 from the position sensor C2, 01 having a malfunction. The selection module 70 determines from the measurement of the fuel flow rate DEB', and knowing the geometric characteristics of the metering device 40, a theoretical position of the slide 41 corresponding to the measured fuel flow rate DEB'. The selection module 70 then determines the position POS' of the slide as corresponding to the position measurement POS1, POS2 closest to the calculated theoretical position. In other words, the selection module 70 identifies the functional sensor as the position sensor C1, C2 returning the measurement POS1, POS2 closest to the calculated theoretical position, and only the measurement of this sensor is taken into account, the other position sensor C2, 01 then being identified as non-functional by the selection module 70.

As can be understood from the description of steps E2_1 and E2_2, the detection during step E1 of a change in the operating state of a position sensor C1, C2 causes a change in the determination of the position POS' of the slide 41 by the selection means 70.

In the state of the art, this variation, in particular in case of malfunction of a position sensor while both were operating, would cause a sudden deviation between the determined position POS' of the slide 41 and the position setpoint CPT'. This deviation from the position of the slide 41 would then induce a compensation by the second monitoring module 30 so that the position POS' of the slide 41 can converge towards the position setpoint CPT'. Such regulation would then lead to a momentary drop in the power of the turbomachine 50.

In order to avoid this risk, when a change in the operating state of one of the position sensors C1, C2 is detected by the detection module 60, the position setpoint CPT' is then modified as follows.

Knowing the geometric characteristics of the metering device 40, following the detection of a change in the operating state, the calculation module 80 then calculates, during a step E3, a first instantaneous flow rate DI value of fuel delivered to the combustion chamber 51, this value corresponding to the position POS' of the slide 41 determined by the selection module 70 during step E2_1 or E2_2, a second instantaneous flow rate value of fuel delivered by the metering device to the combustion chamber from the position of the metering element preceding the last determined position, and a fuel flow rate deviation between the first calculated instantaneous fuel flow rate and the second calculated instantaneous fuel flow rate. In other words, the calculation module 80 calculates during an iteration n of the method, a first instantaneous flow rate corresponding to the instantaneous fuel flow rate for the current iteration n, a second instantaneous flow rate corresponding to the instantaneous fuel flow rate for the previous iteration n-1 and the fuel flow rate deviation between the first flow rate and the second flow rate.

The first monitoring module 10 is a logic of monitoring of the turbomachine 50 power. The object of the first monitoring module 10 is to ensure that the turbomachine 50 indeed provides the requested power. The first monitoring module receives, on the one hand, a power setpoint signal CP' for the turbomachine. The power setpoint CP' is, by way of example, produced as a function of the angular position of a throttle control lever of the aircraft actuated by a pilot. The first monitoring module receives, on the other hand, the power measurement PM' signal of the turbomachine 50 measured by the measurement means 7. As a function of the deviation between the power setpoint CP' and the measured power PM', the first monitoring module 10 then determines, during a step E4, a flow rate setpoint CD' of fuel to be injected into the combustion chamber 51, so that the turbomachine 50 provides a power PM' corresponding to the power setpoint CF.

The first monitoring module 10 receives, as an additional input, the fuel flow rate deviation calculated by the calculation module 80 and then calculates, from the received fuel flow rate deviation, a new fuel flow rate setpoint CD', so as to match the position setpoint CPT' of the slide 41 with the position POS' of the slide determined by the selection module 70.

The adjustment of the flow rate setpoint CD' from the fuel flow rate deviation between the first calculated instantaneous flow rate DI and the second instantaneous flow rate DI' is made by the first monitoring module 10 only when a change in the operating state of a position sensor C1, C2 is detected. Conversely, as long as such a situation of change in the operating state is not identified, the first monitoring module 10 calculates the flow rate setpoint CD' only based on the power setpoint CP' and on the power measurement PM' of the turbomachine 50.

In order to inform the first monitoring module 10 of calculating the flow rate setpoint CD' taking into account the instantaneous flow rate DI returned by the calculation module 80, the selection module 70 can return to the first monitoring module 10 information relating to the results of one or more of steps E1, E2_1, E2_2, for example a character string or a numeric integer.

During a step E5, the converter 20 converts the new flow rate setpoint CD' determined by the first monitoring module 10, that is to say the corrected flow rate setpoint, into a position setpoint CPT' of the slide 41 of the metering device 40. It is recalled that the pressure difference on either side of the slide 41 is kept constant and that the fuel volume flow rate is therefore proportional to the section S of the fuel passage. Thus, in a known manner, knowing the geometric characteristics of the metering device 40, the converter 20 is capable of determining the position setpoint CPT' of the slide 41 as a function of the requested fuel flow rate setpoint CD'.

The second monitoring module 30 takes as inputs the position POS' and the position setpoint CPT' of the slide 41 determined by the converter 20 during step E5. The second monitoring module 30 is a logic of monitoring of the position of the slide 41 of the metering device 40. The object of this second monitoring module 30 is to ensure that the position POS' of the slide 41 corresponds to the requested position setpoint CPT'. As a function of the deviation between the position of the slide 41 and the position setpoint CPT', the second monitoring module 30 determines during a step E6 a signal of command CMD' of displacement of the slide 41.

The displacement command CMD' signal is used as input by the associated actuator 42 of the slide 41. The displacement command CMD' signal is by way of example a command current for the actuator 42.

During a step E7, after receiving the displacement command CMD' signal, the actuator 42 moves the slide 41 as a function of this signal. The command signal CMD' therefore allows the actuator 42 to move the slide 41 so that its position POS' corresponds to the position setpoint CPT'.

Steps E1 to E7 described above constitute an iteration of a method executed by the control means 90. Thus, after execution of step E7, the succession of steps E1 to E7 is again executed during the following iterations of the method.

The advantages of the embodiments described above are illustrated in FIG. 5. This figure illustrates, for the same time abscissa, the respective variations on the ordinate of the determined position POS' of the slide 41, of the position setpoint CPT', of the measured fuel flow rate DEB', of the command CMD' signal of the actuator 42, of the measured power PM' of the turbomachine 50 and of the power setpoint CP'.

Figure 5:
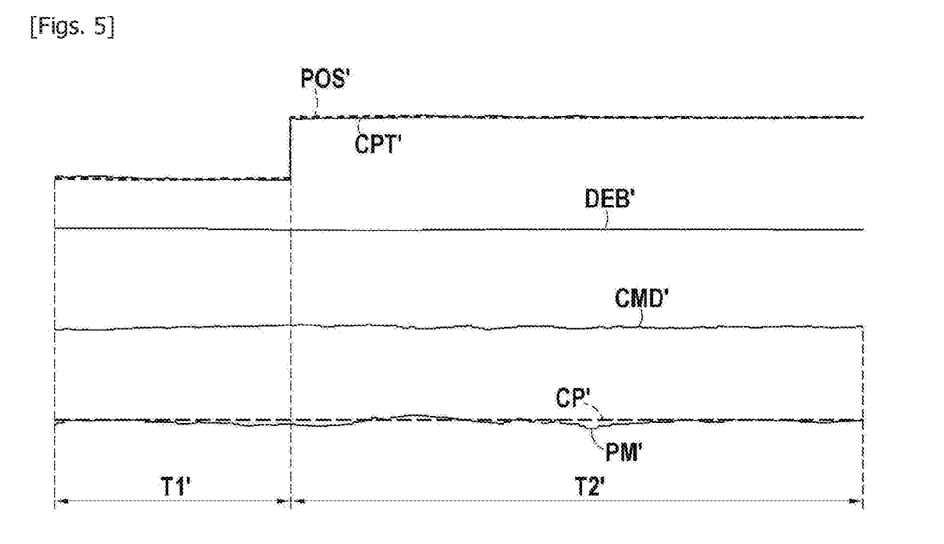
FIG. 5 illustrates the time variations of various variables relating to the control system of FIG. 3 according to one embodiment.

In this figure, it is initially observed, during a time period T1', that the position POS of the slide 41 coincides with the position setpoint value CPT' of the slide. Consequently, the measured power PM' of the motor meets the requested power setpoint CP'. In this example, during this initial situation, one of the sensors among the two position sensors C1, C2 measuring the position of the slide 41 already has a malfunction which has not yet been detected by the detection module 60. Nevertheless, despite the failure of this sensor, the position setpoint CPT value of the slide and the power setpoint CP value are still met thanks to the first and second monitoring modules 10, 30. During the time period T1', the position POS' of the slide 41 is therefore initially determined by calculating the average of the position measurements POS1, POS2 returned by the two position sensors C1, C2.

At the start of a time period T2' consecutive to T1', the detection module 60 detects an anomaly in the measurements returned by one of the position sensors C1, C2 (e.g.: a large deviation between the measurements of the sensors) and then deduces a malfunction of one of the sensors. The selection module 70 then identifies the functional sensor and the sensor having a malfunctioning among the position sensors C1, C2, and then determines the actual position POS' of the slide 41 based on the position measurement of the functional sensor. A sudden increase in the value of the position signal POS' is therefore observed at the transition time between the periods T1' and T2'. The calculation module 80 then calculates an instantaneous flow rate value DI it provides to the first monitoring module 10. The first monitoring module 10 then recalculates, from the instantaneous flow rate value DI, the fuel flow rate setpoint CD' such that the position setpoint CPT' of the slide corresponds to the position value POS' of the slide 41. Thus, the position setpoint CPT' also changes and corresponds to the value of the position signal POS' can be observed in FIG. 5. During the following iterations of the method, taking into account the fact that the position POS' of the slide 41 corresponds to the position setpoint CPT', the second monitoring module 30 does not seek to readjust the position POS' of the slide 41. The command CMD' signal generated by this module then remains constant. As the position of the slide remains unchanged, the measurement of the flow rate DEB' of fuel delivered by the metering device 40 to the combustion chamber 51 of the turbomachine 50 also remains constant. As the delivered flow rate remains constant and the position POS' of the slide 41 corresponds to the position setpoint CPT', the measured power PM' provided by the turbomachine 50 also remains constant and responds well to the requested power setpoint OF. Thus, following the detection of the malfunction of a position sensor C1, C2, the change in the determination of the position POS' does not impact the power delivered by the turbomachine 50.

The invention claimed is:

1. A method for controlling a fuel metering device with a movable metering element for a combustion chamber of an aircraft turbomachine, this method comprising at least two iterations, including a previous iteration and a current iteration of the following steps:
   a— a step of detecting a possible change in the operating state of a position sensor among a first position sensor and a second position sensor measuring the position of the metering element, each position sensor being either operating or malfunctioning;
   b— if the two position sensors are operating, a first step of determining the position of the metering element from an average between a first position measurement of the first position sensor and a second position measurement of the second position sensor;
   c— if one of the two position sensors is malfunctioning, the other position sensor remaining in operation, a second step of determining the position of the metering element from a position measurement of the position sensor remaining in operation;
   d— a step of determining a flow rate setpoint of fuel to be provided to the combustion chamber from a power setpoint of the turbomachine and a power measurement of the turbomachine;
   e— a step of converting the determined flow rate setpoint into a position setpoint of the metering element;
   f— a step of determining a command of displacement of the metering element from the position setpoint of the metering element and the position determined for the metering element;
   g— a step of controlling the position of the metering element according to the determined displacement command;
   wherein, after detecting a change in the operating state of one of the first and second position sensors during step a) during the current iteration, the method further comprises before step d) of determining a flow rate setpoint of the current iteration:
   h— a step of calculating a first instantaneous flow rate of fuel delivered by the metering device to the combustion chamber from the position of the metering element determined in step b) or c) of the current iteration according to the operating state of the position sensors;
   i— a step of calculating a second instantaneous flow rate of fuel delivered by the metering device to the combustion chamber from the position of the metering element determined in step b) or c) of the previous iteration according to the operating state of the position sensors during the previous iteration;
   j— a step of determining a fuel flow rate deviation between the first instantaneous fuel flow rate calculated in step h) and the second instantaneous fuel flow rate calculated in step i),
   and following the step of determining a flow rate setpoint of the current iteration:
   a step of correcting the flow rate setpoint determined in step d) taking into account the flow rate deviation determined in step j), so as to match the position setpoint of the metering element with the position of the metering element determined in step b) or c) of the current iteration according to the operating state of the position sensors.

2. The control method according to claim 1, wherein the detection of a possible change in the operating state of a position sensor in step a) is carried out when the deviation between the first position measurement of the first position sensor and the second position measurement of the second position sensor is greater than a predetermined threshold.

3. A non-transitory computer readable medium storing computer program including code instructions for implementing the method according to claim 1 when the computer program is executed by a computer.

4. A method for controlling a fuel metering device with a movable metering element for a combustion chamber of an aircraft turbomachine, this method comprising at least two iterations, including a previous iteration and a current iteration of the following steps:
   a— a step of detecting a possible change in the operating state of a position sensor among a first position sensor and a second position sensor measuring the position of the metering element, each position sensor being either operating or malfunctioning:
   b— if the two position sensors are operating, a first step of determining the position of the metering element from an average between a first position measurement of the first position sensor and a second position measurement of the second position sensor;
   c— if one of the two position sensors is malfunctioning, the other position sensor remaining in operation, a second step of determining the position of the metering element from a position measurement of the position sensor remaining in operation;
   d— a step of determining a flow rate setpoint of fuel to be provided to the combustion chamber from a power setpoint of the turbomachine and a power measurement of the turbomachine;
   e— a step of converting the determined flow rate setpoint into a position setpoint of the metering element;
   f— a step of determining a command of displacement of the metering element from the position setpoint of the metering element and the position determined for the metering element;
   g— a step of controlling the position of the metering element according to the determined displacement command;
   wherein, if a change in the operating state of one of the first and second position sensors is detected during step a), the method further comprises before step d) of determining a flow rate setpoint of the current iteration:
   h— a step of calculating a first instantaneous flow rate of fuel delivered by the metering device to the combustion chamber from the position of the metering element determined in step b) or c) of the current iteration according to the operating state of the position sensors;
   i— a step of calculating a second instantaneous flow rate of fuel delivered by the metering device to the combustion chamber from the position of the metering element determined in step b) or c) of the previous iteration according to the operating state of the position sensors during the previous iteration;

j— a step of determining a fuel flow rate deviation between the first instantaneous fuel flow rate calculated in step h) and the second instantaneous fuel flow rate calculated in step i), and following the step of determining a flow rate setpoint of the current iteration:

a step of correcting the flow rate setpoint determined in step d) taking into account the flow rate deviation determined in step j), so as to match the position setpoint of the metering element with the position of the metering element determined in step b) or c) of the current iteration according to the operating state of the position sensors; The control method according to claim 2, wherein, when a change in the operating state of a position sensor is detected, the determination of the position of the metering element in step c) is carried out from the following steps:

a step of calculating an average position of the metering element from an average between the first position measurement of the first position sensor and the second position measurement the second position sensor;

a step of calculating an estimated flow rate of fuel as delivered by the metering device to the combustion chamber for the calculated average position; and if the calculated fuel flow rate is below a predetermined threshold, determining the position of the metering element as corresponding to the largest measurement among the first position measurement and the second position measurement;

if the calculated fuel flow rate is greater than a predetermined threshold, receiving a measurement relating to the flow rate of fuel delivered by the metering device to the combustion chamber, determining a theoretical position of the metering element corresponding to the measured fuel flow rate, and determining the position of the metering element from the measurement closest to the theoretical position among the first position measurement and the second position measurement.

5. A system for controlling a fuel metering device with a movable metering element for a combustion chamber of an aircraft turbomachine, this system comprising:

a first position sensor and a second position sensor configured to measure the position of the metering element of the metering device;

measuring means configured to measure the power of the turbomachine;

a detection module configured to detect a possible change in the operating state of one of the position sensors among the first position sensor and the second position sensor, each position sensor being either operating or malfunctioning;

a selection module being configured to determine if the two position sensors are operating, the position of the metering element from an average between a first position measurement of the first position sensor and a second position measurement of the second position sensor;

if one of the two position is malfunctioning, the other position sensor remaining in operation, the position of the metering element from a position measurement of the position sensor remaining in operation;

a first monitoring module configured to determine a flow rate setpoint of fuel to be provided to the combustion chamber from a power setpoint of the turbomachine and from the power measurement of the turbomachine;

a converter configured to convert the determined flow rate setpoint into a position setpoint of the metering element;

a second monitoring module configured to determine a command of displacement of the metering element from the position setpoint of the metering element and the position determined for the metering element;

an actuator configured to control the position of the metering element according to the determined displacement command;

the system further comprising a calculation module configured to calculate, if a change in the operating state of the first or second position sensor is detected by the detection module, a first instantaneous flow rate of fuel delivered by the metering device to the combustion chamber from the last position of the determined metering element, calculate a second instantaneous flow rate of fuel delivered by the metering device to the combustion chamber from the position of the metering element preceding the last determined position, and calculate a fuel flow rate deviation between the first calculated instantaneous fuel flow rate and the second calculated instantaneous fuel flow rate;

the first monitoring module is configured, if a change in the operating state of the first position sensor or of the second position sensor is detected by the detection module, to determine the flow rate setpoint by further taking into account the fuel flow rate deviation calculated by the calculation module, so as to match the position setpoint of the metering element with the position of the metering element determined by the selection module.

6. The control system according to claim 5, wherein the detection module is configured to detect a possible change in the operating state of a position sensor when the deviation between the first position measurement of the first position sensor and the second position measurement of the second position sensor is greater than a predetermined threshold.

7. The control system according to claim 6, wherein when the detection module detects a change in the operating state of a position sensor, the selection module is configured to:

calculate an average position of the metering element from an average between the first position measurement of the first position sensor and the second position measurement of the second position sensor;

calculate an estimated flow rate of fuel as delivered by the metering device to the combustion chamber for the calculated average position; and if the calculated fuel flow rate is below a predetermined threshold, determine the position of the metering element as corresponding to the largest measurement among the first position measurement and the second position measurement;

if the calculated fuel flow rate is greater than a predetermined threshold, receive a measurement relating to the flow rate of fuel delivered by the metering device to the combustion chamber, determine a theoretical position of metering element corresponding to the measured fuel flow rate, and determine the position of the metering element from the measurement closest to the theoretical position among the first position measurement and the second position measurement.

8. The control system according to claim 5, wherein the first monitoring module, the converter, the second monitoring module, the detection module, the selection module and the calculation module form control means integrated into calculator or in an digital engine regulation device.

\* \* \* \* \*